United States Patent [19]
Koike

[11] Patent Number: 5,978,110
[45] Date of Patent: Nov. 2, 1999

[54] HOLOGRAPHIC OPTICAL GRATING AND METHOD FOR OPTIMIZING MONOCHROMATOR CONFIGURATION

[75] Inventor: Masato Koike, Moraga, Calif.

[73] Assignee: The Regents of the University of California, Oakland, Calif.

[21] Appl. No.: 08/657,584

[22] Filed: Jun. 7, 1996

[51] Int. Cl.[6] .................................................. G02B 5/32
[52] U.S. Cl. ........................ 359/16; 359/569; 359/572; 356/305; 356/328; 356/334
[58] Field of Search .............................. 359/16, 569, 570, 359/572, 575; 356/305, 328, 334

[56] References Cited

U.S. PATENT DOCUMENTS

| | | | |
|---|---|---|---|
| 4,455,088 | 6/1984 | Koike | 359/570 |
| 5,052,766 | 10/1991 | Noda et al. | 359/572 |
| 5,528,364 | 6/1996 | Koike | 359/575 |

OTHER PUBLICATIONS

Noda et al., "Design of holographic concave gratings for Seya–Namioka monochromators", Journal of the Optical Society of America, vol. 64, No. 8, pp. 1043–1048, Aug. 1974.

Primary Examiner—Cassandra Spyrou
Assistant Examiner—Darren E. Schuberg
Attorney, Agent, or Firm—Coudert Brothers

[57] ABSTRACT

This invention comprises a novel apparatus for recording a holographic groove pattern on a diffraction grating blank. The recording apparatus is configured using newly developed groups of analytical equations. The invention further comprises the novel holographic diffraction grating made with the inventive recording apparatus. The invention additionally comprises monochromators and spectrometers equipped with the inventive holographic diffraction grating. Further, the invention comprises a monochromator configured to reduce aberrations using a newly developed group of analytical equations. Additionally, the invention comprises a method to reduce aberrations in monochromators and spectrometers using newly developed groups of analytical equations.

47 Claims, 4 Drawing Sheets

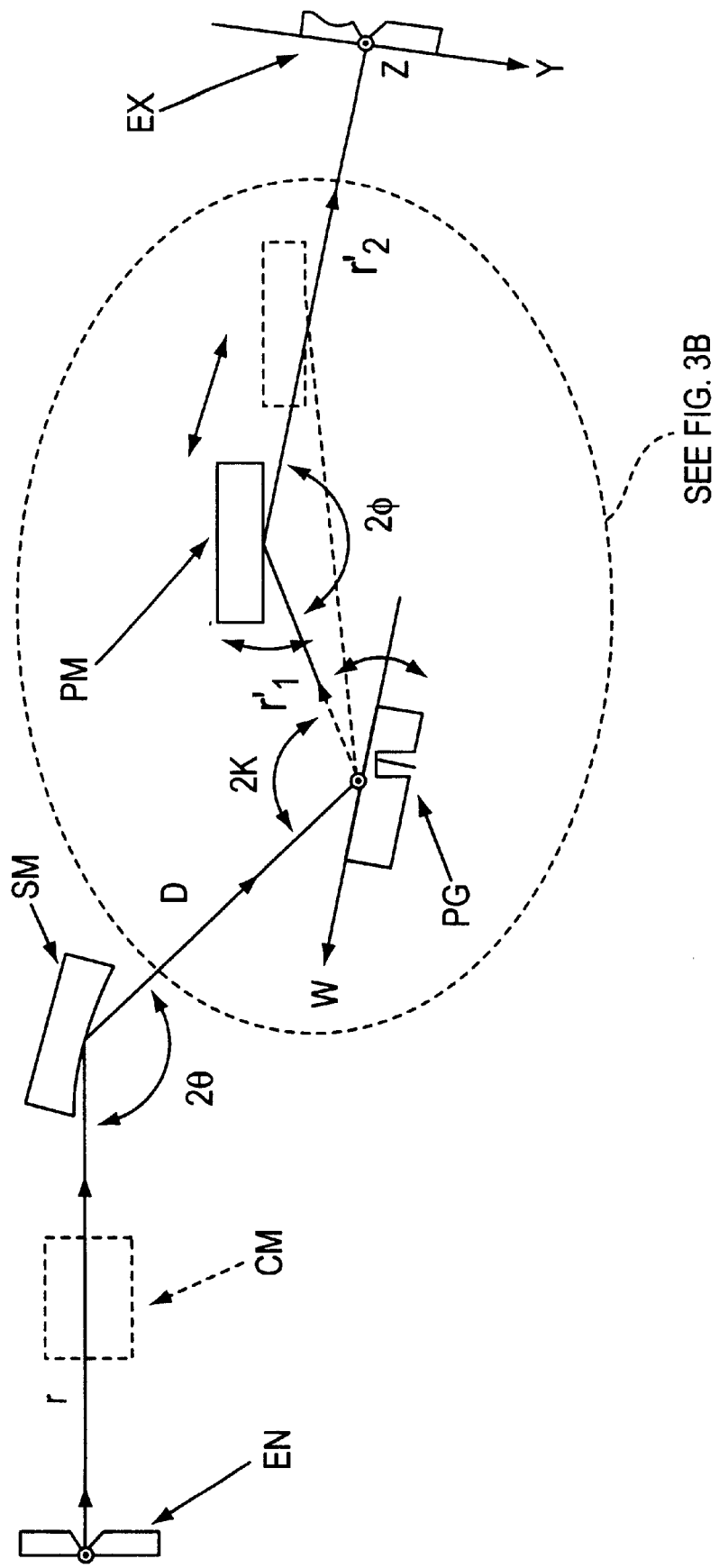

HOLOGRAPHIC OPTICAL GRATING AND METHOD FOR OPTIMIZING MONOCHROMATOR CONFIGURATION

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

BACKGROUND OF THE INVENTION

1. Field of the Invention

This invention relates generally to high resolution spectrometer optics. More specifically the invention relates to diffraction gratings used in monochromators and spectrometers. Additionally the invention relates to a novel optical system for monochromators and spectrometers.

2. Description of Related Art

Currently monochromators used in the extreme ultraviolet (EUV) region have a resolving power, $\lambda/\Delta\lambda$, of between $10^2$ and $10^4$. However, most synchrotron experiments require a $\lambda/\Delta\lambda$ of $10^3$–$10^5$. However, there have been only a few efforts made to develop a high resolution monochromator that could be used for EUV synchrotron radiation. Such monochromators require improved grating designs and/or improved monochromator design in order to meet the requirements of this use.

Hideyuki Noda and Masato Koike disclosed a holographic diffraction grating made from a fringe pattern produced by the interference of two coherent light beams with at least one of the beams having an off-axis orientation and an astigmatic wavefront (U.S. Pat. No. 5,052,766). Usually holographic gratings are limited to the case of spherical and/or plane wavefront recordings. Noda and Koike's holographic grating had variable line spacings to reduce optical aberrations. The manner in which the relative location of grooves could be determined was left to trial and error.

Koike described a significant and successful method to improve the resolving power of monochromators by introducing a varied spacing diffraction grating having mechanically ruled grooves with varied spacing between them (Ser. No. 08/277,404; notice of allowance received Nov. 29, 1995; issue fee paid Feb. 22, 1996, U.S. Pat. No. 5,528,364). The groove spacing was determined using a hybrid design method. Groove spacing was approximately determined by a formula $d_n = d_0 + 2an + 6bn^2 + 4cn^3$, where $d_n$ was the approximate spacing between the nth groove and the (n+1) groove and $d_0 = d + a - b$ where d was the effective grating constant; the ruling parameters 2a, 6b, and 4c were determined from the resolving power R for a specific optical configuration. This method eliminated a lot of the trial and error previously used in making varied-line-spacing gratings. The diffraction grating disclosed by Koike had two difficulties associated with it. The mechanical etching left the grooves with imperfect optical edges, which introduce anomalies into the resulting optical signal; and the parameters 2a, 6b, and 4c, must be uniquely determined for each specific optical configuration.

Due to the small source-point size of third-generation synchrotron radiation sources, high throughput can be made compatible with high resolution simply by eliminating the entrance slit. This requires thermal stability for the grating which in turn requires grating material like silicon carbide (SiC). Currently mechanically ruled SiC gratings require a coating of gold or some other suitable metal on the blanks in order to etch the rulings, and under high heat those metal coatings peel.

It is highly desirable also to suppress overlapping higher orders and scattered light in addition to the aberrations. A laminar grating with a proper land-width to period ratio provides even-order suppression at normal and near-normal incidence. Furthermore, a low stray light level is expected from a holographic grating, both blazed and laminar, because the slow slopes of grooves blazed by preferential etching in Silicon and the lands of square grooves formed in SiC by reactive ion-beam etching are smoother than those produced by mechanical ruling.

These considerations all indicate the need for further studies of holographic gratings for high-resolution and high-flux EUV grazing incidence monochromators.

It would be very useful and desirable to have a diffraction grating that did not contain the imperfections on the groove edges that result from mechanical etching. It would be additionally desirable to be able to use holographic techniques to make diffraction gratings having variable groove spacings without having to resort to a "trial and error" method. It would be yet additionally desirable to be able to determine the groove spacings needed for a high resolution diffraction grating without having to perform a series of laborious numerical determinations, using ray tracing and the resolving power R to obtain ruling parameters 2a, 6b, and 4c for each specific optical configuration. It would be further desirable to be able to adjust a monochromator to optimize performance for a given grating, rather than to design and manufacture gratings that optimize a set optical configuration specific to a particular monochromator.

SUMMARY OF THE INVENTION

The present invention comprises an improved diffraction grating for use in monochromator or spectrophotometer. The inventive grating is made using interference fringes generated from coherent spherical and aspherical wavefronts, or two aspheric wavefronts. Further, the inventive grating is made using analytical equations to generate grooves with specific variations in their spacing. The need for laborious numerical calculations or trail-and-error analysis to determine groove spacing is eliminated. Only the wavefront parameters that create fringes with a particular desired pattern of variable spacing are chosen. Additionally, the present invention comprises monochromator designs equipped with the inventive holographic grating and methods for optimizing a monochromator's configuration.

SUMMARY DESCRIPTION OF THE DRAWINGS

FIG. 1: is a schematic diagram of the optical system used to record a holographic fringe pattern on a blank diffraction grating; the recording parameters are labeled.

FIG. 2: is a schematic view of a first monochromator configuration with the location parameters labeled.

FIG. 3A: is a schematic view of a second monochromator configuration with the location parameters labeled.

FIG. 3B: is an expanded view of the geometry enclosed by brackets in FIG. 3A.

DETAILED DESCRIPTION OF THE INVENTION

The present invention comprises an optical system utilizing an inventive diffraction grating for use in a spectrometer or monochromator. The inventive diffraction grating confers high performance in terms of resolution, spectral purity, and throughput to a monochromator. The monochromator using the inventive grating minimizes the aberrations of individual optical components without using exotic surfaces or a complex scanning mechanism. The inventive grating has varied line spacing and lamellar type grooves, characteristic of holographic gratings.

As used herein, the term "recording parameter" means the distances and angles that describe the relative location of the optical elements, for example mirrors, grating blank, light sources, etc., necessary to make a holographic grating by recording a fringe pattern on grating blank's surface.

As used herein, the term "location parameter" means the distances and angles that describe the relative location of the optical elements, for example mirrors, grating blank, light sources, image plane, etc., of a spectrometer.

The present invention comprises an apparatus for projecting a holographic fringe pattern on a diffraction grating blank where the light sources, mirrors, and grating blank are configured so that the merit function, Q, or for $f_{ijk}$, or for $F_{ijk}$ the analytical equations comprising the recording parameters are minimized. The present invention additionally comprises the inventive holographic grating made with the inventive recording apparatus, said holographic gratings increasing the resolution of monochromators in which they are used.

The present invention further comprises a spectrometer configured for maximum performance by placing the spectrometer elements, such as the mirrors, grating, source and image plane, so that the merit function Q or f(ijk) or F(ijk), the analytical equations comprising location parameters are minimized.

If two spherical wavefronts are used to construct a holographic fringe pattern for recording on a diffraction grating blank, there are only 3 degrees of freedom available to vary in configuring the recording apparatus. In contrast, combining a spherical and aspherical (or plane) wavefront to make a holographic diffraction grating has the advantage of increasing the degrees of freedom. Two coherent point sources are positioned relative to a grating blank. Three free parameters (degrees of freedom) are frequently inadequate to design highly aberration-corrected holographic gratings so a spherical wavefront is combined with an aspheric wavefront to create the holographic fringe pattern.

1. Diffraction Grating made with Aspheric Wave-Front Recording Optics

Figure 1:
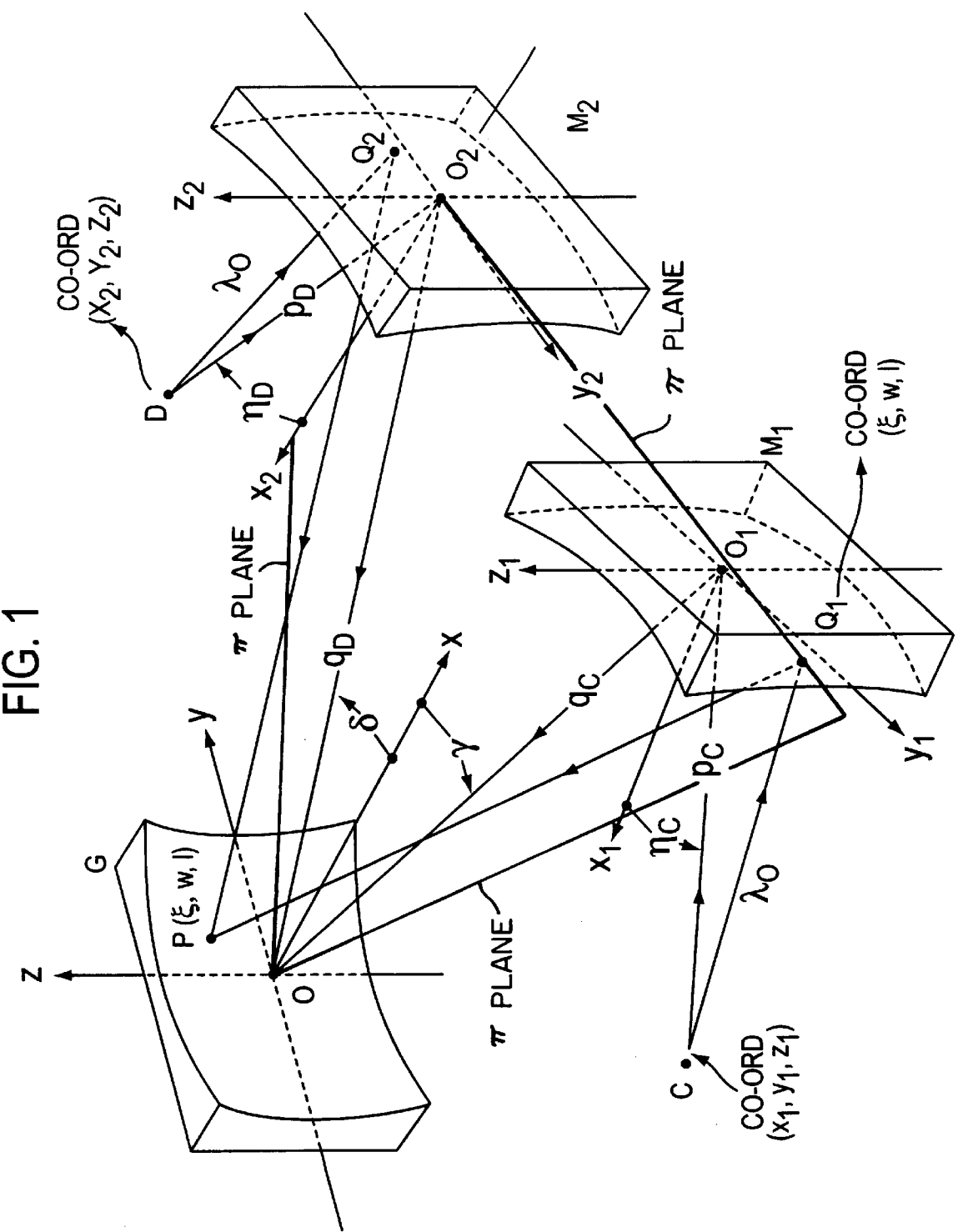

FIG. 1 shows an apparatus for recording a groove pattern on a grating blank G using aspheric wave-front recording optics. The apparatus comprises two coherent point sources C and D having a wavelength of $\lambda_0$, two ellipsoidal mirrors $M_1$ and $M_2$, and an ellipsoidal grating blank, G. In this system, C, D, $M_1$, $M_2$, and G are arranged in such a way that C, D, and the normals of $M_1$, $M_2$, and G at their vertexes, $O_1$, $O_2$, and O, lie in a common plane $\Pi$ and the incident principal rays $CO_1$ and $DO_2$ pass through O after being reflected at $O_1$ and $O_2$, respectively. A coordinate system is attached to each element of the apparatus, with the semi-axis x, y, and z denoted by subscripts 1, and 2, for $M_1$ and $M_2$. No subscript is used for the axis of the coordinates attached to the grating, G. $\xi$, w, and l represent the x, y, and z components of point, P, on the grating. The origin of each respective coordinate system is at O, $O_1$, or $O_2$.

The relative location of the elements of the recording apparatus is described by several recording parameters. They are the distances $p_c=CO_1$, $q_c=O_1O$, $p_D=DO_2$, and $q_D=O_2O$, and the angles of incidence $\eta_c$, $\gamma$, $\eta_D$, and $\delta$ of the principal rays $CO_1$, $O_1O$, $DO_2$, $O_2O$ and the semi-axis of $M_1$, $M_2$, and G. In the inventive recording apparatus, the recording parameters are determined so as to minimize the value of the merit function, Q, or to minimize the equations for $f_{ijk}$ or $F_{ijk}$. These three equations and their relationship to the location parameters are developed below. The sign of $\eta_c$ (and $\eta_D$) is positive or negative depending on whether the principal ray $CO_1$ (or $DO_2$) lies in the first or the fourth quadrant of the $x_1y_1z_1$ (or $x_2y_2z_2$) coordinate system. The ellipsoidal surface figure of the mirror $M_i$ (i=1, 2) is given by $$(\xi_i - a_i)^2/a^2_i + w^2_i/b^2_i + l^2_i/c^2_i = 1, \quad (1)$$

and $\xi_i$ can be expressed in a power series $$\xi_i = \frac{w_i^2}{2R_i} + \frac{l_i^2}{2\rho_i} + \frac{w_i^4}{8a_iR_i^2} + \frac{w_i^2 l_i^2}{4R_i\rho_ia_i} + \frac{l_i^4}{8\rho_i^2 a_i} + O\left(\frac{w_i^6}{R_i^5}\right) \quad (2)$$

where $a_i$, $b_i$, and $c_i$ are the distances along semi-axis of $M_i$ and $$R_i = b^2_i/a_i, \quad P_i = c^2_i/a_i. \quad (3)$$

The rectangular coordinate system xyz is attached to the grating blank G. The y axis lies in the plane $\Pi$. The surface figure of G and its related quantities, $\xi$, R, and $\rho$, are expressed by equations (1)–(3), as written without subscripts. The sign of $\gamma$ (or $\delta$) is positive or negative according as the principal ray $O_1O$ (or $O_2O$) lies in the first or the fourth quadrant of the xyz system.

FIG. 1 shows a ray of wavelength $\lambda_0$ originating from C and reflected at $Q_1(\xi_1, w_1, l_1)$ toward a point $P(\xi, w, l)$ on G. The ray $DQ_2$ of $\lambda_0$ travels toward the point P after being reflected at $Q_2(\xi_2, w_2, l_2)$. Then, the interference fringes formed on the grating blank G, which will be developed into grooves, are expressed by:

$$n\lambda_0 = [(CQ_1+Q_1P)-(DQ_2+Q_2P)]-[(CO_1+O_1O)-(DO_2+O_2O)], \quad (4)$$

A novel inventive grating that has fewer optical aberrations than previously possible is produced using the inventive recording apparatus. The groove parameters lie in a common plane $\Pi$ (l=0) are defined as the coefficients $n_{ij}$ in the following equation:

$$n = \frac{1}{\lambda_0}\left[n_{10}w + \frac{1}{2}n_{20}w^2 + \frac{1}{2}n_{30}w^3 + \frac{1}{8}n_{40}w^4 + \ldots\right] \quad (5)$$

where $$n_{10} = \sin\delta - \sin\gamma, \quad (6)$$

$$n_{20} = T_C - T_D, \quad (7)$$

$$n_{30} = \frac{T_C\sin\gamma}{r_C} - \frac{T_D\sin\delta}{r_D} - \frac{2(A_{10})^2_C}{R_1}K_C\sin\eta_C + \frac{2(A_{10})^2_D}{R_2}K_D\sin\eta_D, \quad (8)$$

-continued $$n_{40} = \frac{T_C}{r_C}\left(\frac{4\sin^2\gamma}{r_C} - T_C\right) - \frac{T_D}{r_D}\left(\frac{4\sin^2\delta}{r_D} - T_D\right) + \frac{S_C - S_D}{R^2} + \quad (9)$$

$$\frac{2(A_{10})_C^2}{R_1}K_C(E_{40})_C\cos\eta_C - \frac{2(A_{10})_D^2}{R_2}K_C(E_{40})_D\cos\eta_D +$$

$$\frac{2(A_{10})_C^3}{R_1^2}\left(\frac{\cos\gamma}{r_C\cos\eta_C} - \frac{(A_{10})_C\cos\eta_C}{a_1}\right) -$$

$$\frac{2(A_{10})_D^3}{R_2^2}\left(\frac{\cos\delta}{r_D\cos\eta_D} - \frac{(A_{10})_D\cos\eta_D}{a_2}\right)$$

In equations (7) to (9) coefficients $T_C$, $S_C K_C$, $(E_{40})_c$, and $(A_{10})_c$ are $$T_C = \frac{\cos^2\gamma}{R} - \frac{\cos\gamma}{R}, S_C = \frac{1}{r_C} - \frac{\cos\gamma}{a}, \quad (10)$$

$$K_C = \frac{\cos\gamma}{r_C} - \frac{(A_{10})_C}{R_1}, \quad (11)$$

$$(A_{10})_C = -\frac{\cos\gamma}{A_C q_C \cos\eta_C}, \quad (12)$$

$$(E_{40})_C = \frac{6}{R}\tan\eta_C\tan\gamma - \frac{\cos\gamma}{r_C}[1 + \tan\eta_C(7\tan\eta_C + 12\tan\eta)] + \quad (13)$$

$$3K_C\tan^2\eta_C\left(1 + \frac{6(A_{10})_C q_C}{R_1\cos\gamma}\right)$$

where $$A_C = \frac{1}{p_C} + \frac{1}{q_C} - \frac{2\sec\eta_C}{R_1}, \quad (14)$$

$$r_C = q_C + \left(\frac{1}{p_C} - \frac{2}{R_1}\sec\eta_C\right)^{-1}. \quad (15)$$

The coefficients for the D ray, $T_D$, $S_D$, $K_D$, $(E_{40})_D$, $(A_{10})_D$, $A_D$, and $r_D$, are noted by the same equations (10) to (15), using a D subscript instead of a C subscript, the number "2" instead of a number "1", and the angle $\delta$ instead of the angle $\gamma$.

The effective grating constant $\sigma$ is given by $$\sigma \equiv 1/[\partial n/\partial w]_{w=l=0} = \lambda_0/n_{10} = \lambda_0(\sin\delta - \sin\gamma). \quad (16)$$

2. Spherical wave-front recording optics (non ellipsoidal mirrors)

When the shape of mirrors $M_1$ and $M_2$ is plane or when the system lacks either $M_1$ or $M_2$, the geometry of recording optics is considered as spherical wave-front recording optics. Then the optical system essentially comprises two coherent point sources C and D having a wavelength of $\lambda_0$, and an ellipsoidal grating blank G. In this system, C, D, and the normal of G are arranged in such a way that C, D, and G at its vertex O, lie in a common plane Π. The distances $\bar{r}_C=CO$ and $\bar{r}_D=DO$, and the angles of incidence $\gamma$ and $\delta$ of the principal rays CO and DO need to be determined, together with the semi-axis of G, so as to meet design requirements, that is to minimize Q or $f_{ijk}$ or $F_{ijk}$.

The rays of wavelength $\lambda_0$ originating from C and D travel toward a point $P(\xi, w, l)$ on G, respectively. Then, the interference fringes formed on the grating blank G, i.e., the grating grooves are expressed by $$n\lambda_0 = [CP-DP]-[CO-DO], \quad (17)$$

The coefficients $n_{ij}$ in equation (5) are defined as $$n_{10} = \sin\delta - \sin\gamma, \quad (18)$$

$$n_{20} = T_C - T_D, \quad (19)$$

$$n_{30} = \frac{T_C\sin\gamma}{\bar{r}_C} - \frac{T_D\sin\delta}{\bar{r}_D}, \quad (20)$$

$$n_{40} = \frac{T_C}{\bar{r}_C}\left(\frac{4\sin^2\gamma}{\bar{r}_C} - T_C\right) - \frac{T_D}{\bar{r}_D}\left(\frac{4\sin^2\delta}{\bar{r}_D} - T_D\right) + \frac{S_C - S_D}{R^2}, \quad (21)$$

In equations. (19)–(20) coefficients $T_C$ and $S_C$ are $$T_C = \frac{\cos^2\gamma}{\bar{r}_C} - \frac{\cos\gamma}{R}, S_C = \frac{1}{\bar{r}_C} - \frac{\cos\gamma}{a}, \quad (22)$$

We obtain the coefficients $T_D$ and $S_D$ from equation (22) by replacing subscripts C and $\gamma$ with D and $\delta$, respectively.

The practical geometry of recording optics sometimes uses various combinations of differently shaped wavefronts, i.e., plane-plane, plane-spherical, spherical-spherical, spherical-aspheric, aspheric-aspheric, and plane-aspheric, in the order of the popularity. When different wavefronts are combined, the notations of the coefficients $n_{ij}$'s seen in equations. (6) to (9) for aspheric wave-front recording optics and equations. Equations (18) to (21), for spherical wavefront recording optics, can be recombined after splitting the terms related the sources C and D.

3. Monochomator in optimal inventive configuration

Figure 2:
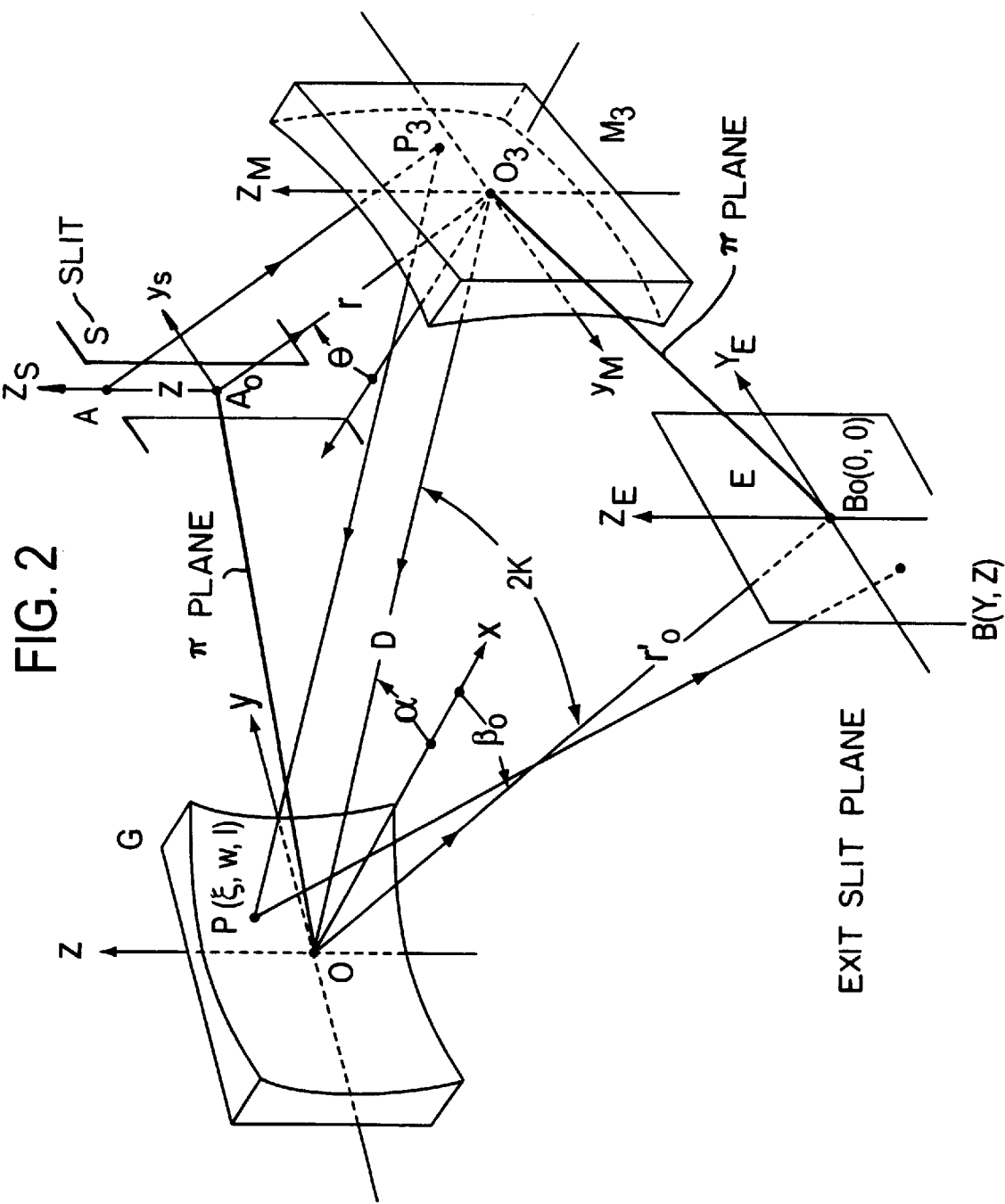

FIG. 2 is a schematic of the inventive monochromator having its optical elements located to optimize its performance with any grating, although the best performance will result if used with the inventive grating described above. The radiation from sources A and $A_0$ shine through the entrance slit S and illuminate an ellipsoidal mirror $M_3$. The mirror $M_3$ delivers a meridional converging beam onto a varied-line-spacing ellipsoidal grating G and focuses monochromatized beam meridionaly at the exit slit plane E. In this system, S, $M_3$, G, and E are arranged in such a way that S, E, and the normals of $M_3$ and G at their vertexes, α, $β_0$, $O_3$ and O, lie in a common plane Π and the incident principal rays $A_0O_3$ passes through O after being reflected at $O_3$. The angles of incidence of the principal ray at $M_3$ and G are θ and α, respectively. The sign of θ (or α) is positive or negative according as the principal ray $A_0O_3$ (or $O_3O$) lies in the first or the fourth quadrant of the xyz axis system. The relevant coordinate axis attached to S, M, G and E are also indicated in FIG. 2. The $y_S$, $y_M$, y, and $y_F$ axis lie in the plane Π and $z_S$, $z_M$, z, and $Z_E$ axis in the vertical plane. The distances between the centers of the each element are $A_0O_3=r$, $O_3O=D$, and $OB_0=r^1{}_0$. Wavelength scanning is made by simple rotation of G about the z axis, while S, $M_3$, E, and the included angle 2K of G are kept fixed.

The principal ray satisfies the grating equation $$\sigma(\sin\alpha+\sin\beta_0)=m\lambda, \quad (23)$$

where $\alpha$, $\beta_0$ and $\sigma$ are the angle of incidence and diffraction of the principal ray and the effective grating constant, respectively.

For the rays in the plane $\Pi$ the analytical expression of the spot distribution can be written in a power series of w in the case of a minimal slit width:

$$Y = w f_{100} + w^2 f_{200} + w^3 f_{300} + O(w^4), \qquad (24)$$

where $$f_{100} = F_{200}, \qquad (25)$$

$$f_{200} = \frac{3}{2} F_{300} + \frac{1}{2} (F_{200})^2 \sec\beta_0 \tan\beta_0 + \qquad (26)$$
$$F_{200} \tan\beta \left[ \frac{1}{R} - \frac{2\cos\beta_0}{r_0'} \right],$$

$$f_{300} = \frac{1}{4} F_{400} + \frac{3}{2} F_{200} F_{300} \sec\beta_0 \tan\beta_0 + \qquad (27)$$
$$\frac{3}{2} F_{300} \tan\beta_0 \left[ \frac{1}{R} - \frac{2\cos\beta_0}{r_0'} \right],$$

The $F_{ijk}$ terms in equation (25) to (27) are $$F_{200} = T_A + T_B + n_{20} \Lambda, \qquad (28)$$

$$F_{300} = \frac{T_A \sin\alpha}{r_A} + \frac{T_B \sin\beta_0}{r_0'} - \frac{2(A_{10})_A^2}{R_3} K_A \sin\theta + n_{30} \Lambda, \qquad (29)$$

$$F_{400} = \frac{T_A}{r_A} \left( \frac{4\sin^2\alpha}{r_A} - T_A \right) + \frac{T_B}{r_0'} \left( \frac{4\sin^2\beta_0}{r_0'} - T_B \right) + \qquad (30)$$
$$\frac{S_A + S_B}{R^2} + \frac{2(A_{10})_A^2}{R_3} K_A (E_{40})_A \cos\theta +$$
$$\frac{2(A_{10})_A^3}{R_3^2} \left[ \frac{\cos\alpha}{r_A \cos\theta} - \frac{(A_{10})_A \cos\theta}{a_3} \right] + n_{40} \Lambda$$

where $$\Lambda = m\lambda/\lambda_0 \qquad (31)$$

Methods to minimize the $F_{ijk}$ and the $f_{ijk}$ functions are well known and are described for analogous sets of equations in many generally available texts and articles. One such article is *Design of holographic concave gratings for Seya-Namioka monochromators*, by H. Noda, et al., J. Opt. Soc. Amer. 64(8): 1043 August 1974.

The coefficients $T_A$, $S_A$ $K_A$, $(E_{40})_A$, $(A_{10})_A$, $A_A$ and $r_A$ in equations (28) to (30) are adapted from equations (10) to (15) by replacing subscripts C and 1 with A and 3, respectively, and angle $\gamma$ with angle $\theta$. Analogously, $T_B$ and $S_B$ are denoted by $$T_B = \frac{\cos^2\beta_0}{r_0'} - \frac{\cos\beta_0}{R}, S_B = \frac{1}{r_0'} - \frac{\cos\gamma}{a}. \qquad (32)$$

4. Design methods

There are three analytical methods to find the location parameters to configure a monochromator for minimal aberrations:

1) Minimize each term of $F_{200}$, $F_{300}$, and $F_{400}$ in a given scanning wavelength range (discussed above);
2) Minimize each term of $f_{100}$, $f_{200}$, and $f_{300}$ in a given scanning wavelength range (discussed above); and
3) Minimize the merit function Q, which closely represents the variance of the spot formed on the image plane when an infinite number of rays are traced through the monochromator.

This merit function is written in terms of weighted sum of $$q(\lambda_i) = \frac{1}{W} \int_{-W/2}^{W/2} (Y - \overline{Y})^2 dw, \overline{Y} = \frac{1}{W} \int_{-W/2}^{W/2} Y dw, \qquad (33)$$

the variance of the spots in the direction of spectral dispersion, and $q(\lambda_i)$, the variance of the spots in the direction perpendicular to the run of spectrum, over wavelengths $\lambda_i$'s chosen in the required scanning range:

$$Q = \sum_{i=1}^{s} \varepsilon(\lambda_i) q(\lambda_i), \qquad (34)$$

where $\varepsilon(\lambda_i)$ is a weighting factor that is usually set equal to unity and W is the groove width.

The explicit equation of $q(\lambda_i)$ is $$q_Y(\lambda) = \frac{1}{12} W^2 f_{100}^2 + \frac{1}{360} W^4 (2 f_{200}^2 + 9 f_{100} f_{300}) + \qquad (35)$$
$$\frac{1}{448} W^6 f_{300}^2.$$

5. Holographic Grating Design examples

We now consider a holographic concave grating for a VLS plane grating monochromator. We assume the following conditions: $R_3 = a_3 = b_3 = c_3 = 82300$ mm, $R = a = b = c$ $\infty$, m(spectral order)=−1, r=16023 mm, D=177 mm, r'=1395.03 mm, $\theta = 88°$, $2K = 172°$, $\sigma = 1/1200$ mm, and a ruled area of 60(W)×25(L) mm$^2$, $\lambda_0 = 441.6$ nm, $\lambda_i = 1.5, 2, 3, 4, 5$ nm.

To show various possibilities in the combination of the types of the wave front, we consider recording systems consisting of (I) two point sources, (II) a point source and a source at infinity and (II) a spherical mirror and two point sources. These systems generate (I) spherical wave fronts, (II) spherical and plane wave fronts, (III) spherical and aspheric wavefronts, respectively. The design parameters were determined by minimizing the merit function (28) by means of a damped least squares method assuming $\varepsilon(\lambda_i) = 1$.

The results obtained are:

Case I: $\bar{r}_c = 5098.670$ mm, $\bar{r}_D = 825.033$ mm, $\lambda = -3.7319°$, $\delta = 27.6993°$;

Case II: $\bar{r}_c = \infty$, $\bar{r}_D = 852.248$ mm, $\lambda = 3.8556°$, $\delta = 36.6669°$;

Case III: $R_1 = \rho_1 = a_1 = 1.0$ m, $p_c = 475.83$ mm, $q_c = 545.84$ mm, $\eta_c = 10.2875°$, $\lambda = -15.3248°$, $\bar{r}_D = 1138.59$ mm, $\delta = 15.40430$.

For purposes of comparison, the design parameters for a mechanically ruled varied-line-spacing grating are given below:

Case IV: $2a = 9.880941 \times 10^{-10}$ mm, $6b = 2.649034 \times 10^{-15}$ mm, $4c = 1.147652 \times 10^{-20}$ mm.

In the following the holographic gratings recorded with the parameters for cases I, II, and III are referred to as HG-1, HG-2, and HG-3, respectively, and also the mechanically ruled grating with the parameters for the case IV is referred to as VG.

The ray-traced spot diagrams and line profiles were constructed for the monochromator equipped with HG-I, HG-II, HG-III, or VG using 1000 rays of 2, 3, and 4 nm originating from a Gaussian source of $\sigma_y$=24–$\mu$m, $\sigma_z$=95–$\mu$m, $\sigma_y'$=416–$\mu$rad, and $\sigma_z'$=424–$\mu$rad.

To figure out a reasonable resolving power from the spot diagram we calculate the standard deviation $\sigma_y$ of ray-traced spots in the direction of dispersion and convert $\sigma_y$ to the standard deviation $\sigma_\lambda$ of the spectral spread for the rays of $\lambda$ by multiplying the reciprocal linear dispersion at $\lambda$. Then, we represent the line profile by an effective Gaussian profile having $\sigma_\lambda$ as its standard deviation. We assume that two similar spectrum lines of $\lambda$ and $\lambda+\Delta\lambda$ are resolved when their effective Gaussian lines are separated by $\Delta\lambda$=2.642$\sigma_\lambda$ to make the minimum resultant intensity between the lines 8/$\pi^2$ as great as the resultant intensity at the central maximum of either of the lines. This definition, $$R \equiv \lambda/\Delta\lambda = \lambda/2.6425\sigma_\lambda, \quad (36)$$

gives a realistic resolving power. Table I shows the values of R for HG-1, HG-2, HG-3, and VG for some wavelengths. These results suggest that the VG and HG would provide almost same performance both in the resolving power and throughput.

TABLE I

| Wavelength (nm) | 2 | 3 | 4 | 5.8 |
|---|---|---|---|---|
| HG-1 (Case I) | 4985 | 7879 | 9075 | 11670 |
| HG-2 (Case II) | 4700 | 7761 | 9286 | 11841 |
| HG-3 (Case III) | 4888 | 8111 | 9125 | 11991 |
| VG (Case IV) | 5188 | 7732 | 8745 | 12246 |

Silicon carbide(SiC) and silicon are good materials for heat-resistant grating blanks. Uncoated SiC laminar gratings of high quality are produced by means of holographic recording of grooves and subsequent etching. Such gratings withstand, without deformation, the high temperatures resulting from high energy radiation shone directly on the grating without use of an entrance slit.

6. Second Monochromator Design example

Figure 3B:
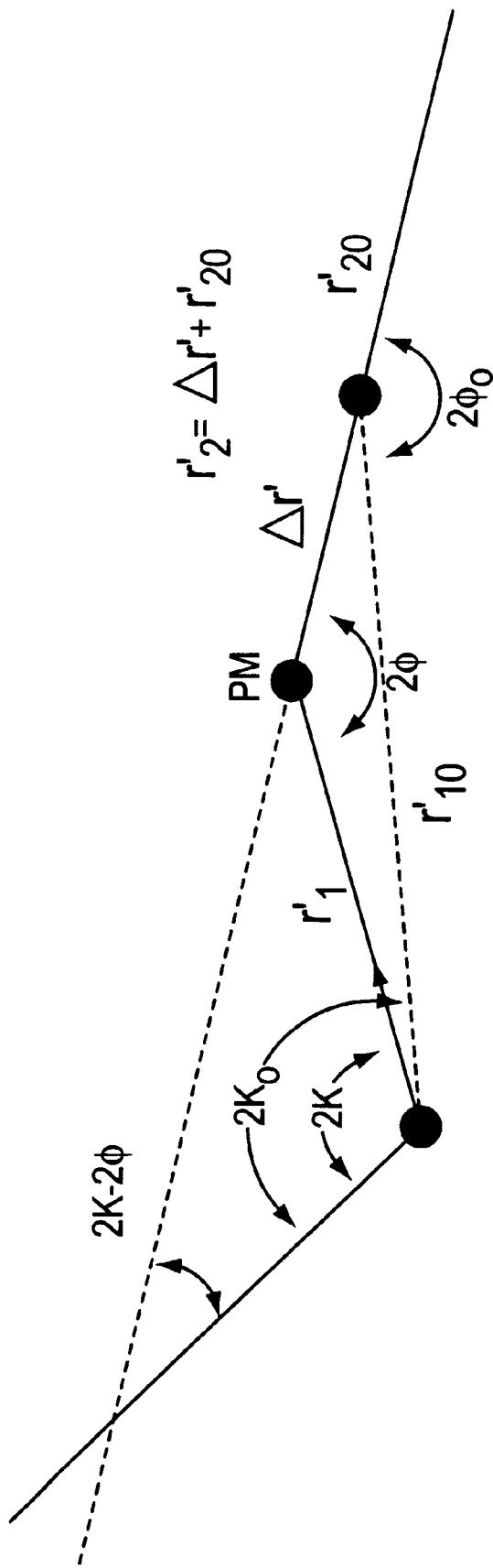

Referring to FIG. 3A, the centers of the entrance slit EN, spherical mirror SM, traveling plane mirror with simultaneous rotation PM, grating PG, and exit slit EX lie in a single vertical plane. Mirror PM moves a function of the scanning wavelength, $\lambda$. As shown in FIG. 3A, PM moves to the left for relatively longer wavelengths and to the right toward PM' for relatively shorter wavelengths. A spherical mirror SM accepts the beam from the entrance slit EN at an angle of incidence $\theta$ and produces a vertically converging beam incident onto a varied spacing plane grating PG. Vertically diffracted light of wavelength $\lambda$ is focused on the exit slit EX and can also be focused horizontally if an optional concave mirror CM is inserted. Wavelength scanning is carried out by rotating the grating about a central groove while mirror PM is also traveling on the normal to the exit slit and rotating. Therefore the deviation angle 2K of the grating varies as a function of the scanning wavelength.

Because the plane mirror PM only reflects the diffracted rays to the exit slit at an angle p, the system is considered to be a double-element system comprising the mirror SM and the grating PG. Thus, the design of this monochromator is determined by the ruling parameters of the grating, the distance PG-to-PM-to-EX=r'=r'$_1$+r'$_2$ and the deviation angle 2K for given values of the wavelength scanning range $\lambda_{min}$–$\lambda_{max}$, grating constant d, spectral order m, radius of curvature $R_3$ of SM, distance EN-to-SM=r, distance SM-to-PG=D, and angles $\theta$, and K–$\phi$.

The monochromator design assumes $\lambda_{min}$=0.5 nm, $\lambda_{max}$=10 nm, m=1, d=1/2400 mm, W=100 mm, L=50 mm, H=1 mm, $R_3$=155.7 m, r=18 m, D=200 mm, $\theta$=88°, and K–$\phi$=–1°. Also $K_0$=88°, $\phi_0$=89°, $r_{10}'$=400.00 mm, and $r_{20}'$=1647.78 mm. The distances r'$_1$ and r'$_2$, and angles $\phi_0$ and $\phi$ needed to fulfill the requirements of the fixed exit slit are now expressed as $$r_1' = \frac{\sin 2\phi_0}{\sin 2\phi} r_{10}', \; \Delta r' = \frac{\sin 2(\phi_0 - \phi)}{\sin 2\phi} r_{10}', \; r_2' = r_{20}' + \Delta r'. \quad (37)$$

The design parameters determined with $\lambda_n$'s=0.5, 2.5, 5.0, 7.5, and 10.0 nm are shown for two circumstances: (I) a holographic grating recorded by an apparatus comprising a spherical mirror and two point sources; and (II) a mechanically ruled varied-line-spacing grating (as described in patent application SN 08/277,404 mentioned above).

Case I: $R_1$=$\rho_1$=$a_1$=1.0 m, $p_c$=484.55 mm, $q_c$=250.00 mm, $\eta_c$=–35.366547°, $\lambda$=–36.8560000°, $r_D$=983.81 mm, $\delta$=27.389306°;

Case II: 2a=1.762906×10$^{-10}$ mm, 6b=5.299280×10$^{-17}$ mm, 4c=1.354672×10$^{-23}$ mm.

The wavelength dependent parameters K, $\phi$, $r_1'$, $r_2'$, and r' for both Cases I and II are listed in Table II.

TABLE II

| Wavelength (nm) | K. (°) | ø (°) | $R_1'$ (mm) | $r_2'$ (mm) | r' (mm) |
|---|---|---|---|---|---|
| 15 | 88.008615 | 89.008615 | 403.48 | 1644.30 | 2047.78 |
| 25 | 85.483011 | 86.483011 | 114.00 | 1934.40 | 2048.40 |
| 50 | 83.502217 | 84.502217 | 73.19 | 1975.69 | 2048.88 |
| 75 | 81.907831 | 82.907831 | 56.97 | 1992.31 | 2049.28 |
| 100 | 80.500226 | 81.500226 | 47.75 | 2001.88 | 2049.63 |

Spot diagrams and line profiles were constructed for the monochromator using the parameters shown in Case I (a) and Case II (b), respectively. Each diagram was constructed with 500 randomly generated rays for individual wavelengths. Also included was a grating having W=100 mm and L=50 mm, and an undulator source. The resolving power R defined by equation (36) were also graphed. The data is shown in table III. From these results the expected resolving power is between about 10,000 and about 30,000 for both holographic and mechanically ruled VLS gratings.

TABLE III

| Wavelength (nm) | 0.5 | 2.5 | 5 | 7.5 | 10 |
|---|---|---|---|---|---|
| HG (Case I) | 9928 | 21304 | 28081 | 29235 | 32901 |
| VG (Case II) | 10378 | 21257 | 28898 | 34019 | 37425 |

Thus, the invention provides a novel diffraction grating that reduces aberrations resulting from the spherical mirror in monochromators. The invention further corrects for changes in focal length for different wavelengths by translating and rotating a plane mirror in the optical path. A monochromator employing the inventive optical system increases resolution from a previously achieved value of 10,000 by a factor of 3 to resolution equal to 30,000. As synchrotron radiation sources improve, it is expected that the resolution will improve by a factor of 70,000.

The description of illustrative embodiments and best modes of the present invention are not intended to limit the scope of the invention. Various modifications, alternative constructions and equivalents may be employed without departing from the true spirit and scope of the appended claims.

Having thus described the invention, I claim:

1. An apparatus for projecting an on-plane holographic fringe pattern on a diffraction grating blank wherein a plurality of optical elements in the apparatus are located relative to one another according to their associated recording parameters, determined by mathematically minimizing a merit function Q, where $$Q = \sum_{i=1}^{S} \epsilon(\lambda_i) q(\lambda_i),$$

where $\epsilon(\lambda_1)$ is a weighting factor and $q(\lambda_i)$ is a variance over the wavelengths $\lambda_i$.

2. The apparatus of claim 1 wherein the optical elements comprise,
 a) two coherent sources of light; and
 b) a grating blank,
 said elements located relative to one another using values obtained by minimizing the merit function Q.

3. The apparatus of claim 1 wherein the optical elements comprise,
 a) two coherent sources of light;
 b) a mirror; and
 c) a grating blank,
 said elements located relative to one another using values obtained by minimizing the merit function Q.

4. The apparatus of claim 3 further comprising a second mirror.

5. The apparatus of claim 1 wherein the recording parameters comprise $\bar{r}_C$, $\bar{r}_D$, $\gamma$, and $\delta$, where $\bar{r}_C$ is a distance between a light source C and a center of a grating blank, $\bar{r}_D$ is a distance between a light source D and the center of the grating blank, $\gamma$ is an angle between a normal to the center of the grating blank and a light ray traveling from a center of a first mirror, $M_1$, to the center of the grating blank, and $\delta$ is an angle between the normal to the center of the grating blank and a light ray traveling from a center of a second mirror, $M_2$, to the center of the grating blank.

6. The apparatus of claim 1 wherein the recording parameters comprise $p_c$, $q_c$, $\bar{r}_D$, $\gamma$, $\delta$, and $\eta_C$, where $p_c$ is a distance between a light source C and a center of a first mirror $M_1$, $q_c$ is a distance between the center of the first mirror $M_1$ and a center of a grating blank, $\bar{r}_D$ is a distance between a light source D and the center of the grating blank, $\gamma$ is an angle between a normal to the center of the grating blank and a light ray traveling from a center of the first mirror, $M_1$, to the center of the grating blank, $\delta$ is an angle between the normal to the center of the grating blank and a light ray traveling from a center of a second mirror, $M_2$, to center of the grating blank, and $\eta_c$ is an angle between a normal to the center of the first $M_1$ and a light ray traveling from the light source C to the center of the mirror $M_1$.

7. The apparatus of claim 1 wherein the recording parameters comprise $\bar{r}_C$, $p_D$, $q_D$, $\gamma$, $\delta$, and $\eta_D$, where $\bar{r}_c$ is a distance between a light source C and a center of a grating blank, $p_D$ is a distance between a light source D and a center of a second mirror $M_2$, $q_D$ is a distance between the center of the second mirror $M_2$ and the center of the grating blank, $\gamma$ is an angle between a normal to the center of the grating blank and a light ray traveling from a center of a first mirror, $M_1$, to the center of the grating blank, $\delta$ is an angle between the normal to the center of the grating blank and a light ray traveling from the center of a second mirror, $M_2$, to the center of the grating blank, and $\eta_D$ is an angle between a normal to the center of the second mirror $M_2$ and a light ray traveling from the light source D to the center of the mirror $M_2$.

8. The apparatus of claim 1 wherein the recording parameters comprise $p_c$, $q_c$, $p_D$, $q_D$, $\gamma$, $\delta$, $\eta_c$, and $\eta_D$, where $p_c$ is a distance between a light source C and a center of a first mirror $M_1$, $q_c$ is a distance between the center of the first mirror $M_1$ and a center of a grating blank, $p_D$ is a distance between a light source D and a center of a second mirror $M_2$, $q_D$ is a distance between the center of the second mirror $M_2$ and the center of the grating blank, $\gamma$ is an angle between a normal to the center of the grating blank and a light ray traveling from the center of the first mirror, $M_1$, to the center of the grating blank, $\delta$ is an angle between normal to the center of the grating blank and a light ray traveling from the center of the second mirror, $M_2$, to the center of the grating blank, $\eta_c$, is an angle between a normal to the center of the first mirror $M_1$ and a light ray traveling from the light source C to the center of the mirror $M_1$, and $\eta_D$ is an angle between a normal to the center of the second mirror $M_2$ and a light ray traveling from the light source D to the center of the mirror $M_2$.

9. An apparatus for projecting an on-plane holographic fringe pattern on a diffraction grating blank wherein a plurality of optical elements in the apparatus are located according to recording parameters that are determined by mathematically minimizing a set of power series functions, $f_{100}$, $f_{200}$, and $f_{300}$ in an analytical expression of spot distribution.

10. The apparatus of claim 9 wherein the optical elements comprise,
 a) two coherent sources of light; and
 b) a grating blank,
 said elements located in a common plane relative to one another using values obtained by minimizing the analytical functions $f_{100}$, $f_{200}$, and $f_{300}$.

11. The apparatus of claim 9 wherein the optical elements comprise,
 a) two coherent sources of light;
 b) a mirror, and
 c) a grating blank,
 said elements located in a common plane relative to one another using values obtained by minimizing the analytical functions $f_{100}$, $f_{200}$, and $f_{300}$.

12. The apparatus of claim 11 further comprising a second mirror.

13. The apparatus of claim 9 wherein the recording parameters comprise, $\bar{r}_C$, $\bar{r}_D$, $\gamma$, and $\delta$, where $\bar{r}_C$ is a distance between a light source C and a center of a grating blank, $\bar{r}_D$ is a distance between a light source D and the center of the grating blank, $\gamma$ is an angle between a normal to the center of the grating blank and a light ray traveling from a center of a first mirror, $M_1$, to the center of the grating blank and $\delta$ is an angle between the normal to the center of the grating blank and a light ray traveling from a center of a second mirror, $M_2$, to the center of the grating blank.

14. The apparatus of claim 9 wherein the recording parameters comprise $p_c$, $q_c$, $\bar{r}_D$, $\gamma$, $\delta$, and $\eta_c$, where $p_c$ is a distance between a light source C and a center of a first mirror $M_1$, $q_c$ is a distance between the center of the first mirror $M_1$ and a center of a grating blank, $\bar{r}_D$ is a distance between a light source D and the center of the grating blank, $\gamma$ is an angle between a normal to the center of the grating blank and a light ray from a center the first mirror, $M_1$, to the center of the grating blank, δ is an angle between the normal to the center of the grating blank and a light ray traveling from a center of a second mirror, $M_2$, to the center of the grating blank, and $\eta_c$ is an angle between a normal to the center of the first mirror $M_1$ and a light ray traveling from the light source C to the center of the mirror $M_1$.

15. The apparatus of claim 9 wherein the recording parameters comprise $\bar{r}_C$, $p_D$, $q_D$, γ, δ, $\eta_D$, where $\bar{r}_c$ is a distance between a light source C and a center of a grating blank, $p_D$ is a distance between a light source D and a center of a second mirror $M_2$, $q_D$ is a distance between the center of the second mirror $M_2$ and the center of the grating blank, γ is an angle between a normal to the center of the grating blank and a light ray traveling from a center of a first mirror, $M_1$, to the center of the grating blank, δ is an angle between the normal to the center of the grating blank and a light ray traveling from the center of a second mirror, $M_2$, to the center of the grating blank, and $\eta_D$ is an angle between a normal to the center of the second mirror $M_2$ and a light source D to the center of the mirror $M_2$.

16. The apparatus of claim 9 wherein the recording parameters comprise $p_c$, $q_c$, $p_D$, $q_D$, γ, δ, $\eta_c$, and $\eta_D$, where $p_c$ is a distance between a light source C and a center of a first mirror $M_1$, $q_c$ is a distance between the center of the first mirror $M_1$ and a center of a grating blank, $p_D$ is a distance between a light source D and a center of a second mirror $M_2$, $q_D$ is a distance between the center of the second mirror $M_2$ and the center of the grating blank, γ is an angle between a normal to the center of the grating blank and a light ray traveling from the center of the first mirror, $M_1$, to the center of the grating blank, δ is an angle between the normal to the center of the grating blank and a light ray traveling from the center of the second mirror, $M_2$, to the center of the grating blank, $\eta_c$ is an angle between a normal to the center of the first mirror $M_1$ and a light ray traveling from the light source C to the center of the mirror $M_1$, and $\eta_D$ is an angle between a normal to the center of the second mirror $M_2$ and a light ray traveling from the light source D to the center of the mirror $M_2$.

17. An apparatus for projecting an on plane holographic fringe pattern on a diffraction grating blank wherein a plurality of optical elements in the apparatus are located according to recording parameters that are determined by mathematically minimizing a set of power series functions, $f_{200}$, $f_{300}$, and $f_{400}$ in an analytical expression of spot distribution.

18. The apparatus of claim 17 wherein the optical elements comprise,
a) two coherent sources of light; and
b) a grating blank,
said elements located in a common plane relative to one another using values obtained by minimizing the analytical functions $f_{200}$, $f_{300}$, and $f_{400}$.

19. The apparatus of claim 17 wherein the optical elements comprise,
a) two coherent sources of light;
b) a mirror, and
c) a grating blank,
said elements located in a common plane relative to one another using values obtained by minimizing the analytical functions $f_{200}$, $f_{300}$, and $f_{400}$.

20. The apparatus of claim 19 further comprising a second mirror.

21. The apparatus of claim 17 wherein the recording parameters comprise $\bar{r}_c$, $\bar{r}_D$, γ, and δ, where $\bar{r}_C$ is a distance between a light source C and a center of a grating blank, $\bar{r}_D$ is a distance between a light source D and the center of the grating blank, γ is an angle between a normal to the center of the grating blank and a light ray traveling from a center of a first mirror, $M_1$, to the center of the grating blank, and δ is an angle between the normal to the center of the grating blank and a light ray traveling from a center of a second mirror, $M_2$, to the center of the grating blank.

22. The apparatus of claim 17 wherein the recording parameters comprise $p_c$, $q_c$, $\bar{r}_D$, γ, δ, and $\eta_c$, where $p_c$ is a distance between a light source C and a center of a first mirror $M_1$, $q_c$ is a distance between the center of the first mirror $M_1$ and a center of a grating blank, $\bar{r}_D$ is a distance between a light source D and the center of the grating blank, γ is an angle between a normal to the center of the grating blank and a light ray traveling from a center of the first mirror, $M_1$, to the center of the grating blank, δ is an angle between the normal to the center of the grating blank a light ray traveling from a center of a second mirror, $M_2$, to the center of the grating blank, and $\eta_c$ is an angle between a normal to the center of the first mirror $M_1$ and a light ray traveling from the light source C to the center of the mirror, $M_1$.

23. The apparatus of claim 17 wherein the recording parameters comprise $\bar{r}_C$, $p_D$, $q_D$, γ, δ, and $\eta_D$, where $\bar{r}_c$ is a distance between a light source C and a center of a grating blank, $p_D$ is a distance between a light source D and a center of a second mirror $M_2$, $q_D$ is a distance between the center of the second mirror $M_2$ and the center of the grating blank, γ is an angle between a normal to the center of the grating blank and a light ray traveling from a center of a first mirror, $M_1$, to the center of the grating blank, δ is an angle between the normal to the center of the grating blank and a light ray traveling from the center of a second mirror, $M_2$, to the center of the grating blank, and $\eta_D$ is angle between a normal to the center of the second mirror $M_2$ and a light ray traveling from the light source D to the center of the mirror $M_2$.

24. The apparatus of claim 17 therein the recording parameters comprise $p_c$, $q_c$, $p_D$, $q_D$, γ, δ, $\eta_c$ and $\eta_D$, where $p_c$ is a distance between a light source C and a center of a first mirror $M_1$, $q_c$ is a distance between the center of the first mirror $M_1$ and a center of a grating blank, $p_D$ is a distance between a light source D and a center of a second mirror, $M_2$, $q_D$ is a distance between the center of the second mirror $M_2$ and the center of the grating blank, γ is an angle between a normal to the center of the grating blank and a light ray traveling from the center of the first mirror, $M_1$, to the center of the grating blank, δ is an angle between the normal to the center of the grating blank and a light ray traveling from the center of the second mirror, $M_2$, to the center of the grating blank, $\eta_c$ is an angle between a normal to the center of the first mirror $M_1$ and a light ray traveling from the light source C to the center of the mirror $M_1$, and $\eta_D$ is an angle between a normal to the center of the second mirror $M_2$ and a light ray traveling from the light source D to the center of the mirror $M_2$.

25. A diffraction grating manufactured using the apparatus of claim 1.

26. The grating of claim 25 wherein the grating blank comprises silicon carbide.

27. A diffraction grating manufactured using the apparatus of claim 9.

28. The grating of claim 27 wherein the grating blank comprises silicon carbide.

29. A diffraction grating manufactured using the apparatus of claim 17.

30. The grating of claim 29 wherein the grating blank comprises silicon carbide.

31. A spectrometer in which the location parameters of an entrance slit plane, a mirror, a diffraction grating, and an exit slit plane are located on a common plane and are determined by mathematically minimizing the merit function Q, where $$Q = \sum_{i=1}^{S} \epsilon(\lambda_i) q(\lambda_i),$$

where $\epsilon(\lambda_i)$ is a weighting factor and $q(\lambda_i)$ is a variance over the wavelengths $\lambda_i$.

32. A spectrometer in which the location parameters of an entrance slit plane, a mirror, a diffraction grating, and an exit slit are located on a common plane and are determined by mathematically minimizing a set of power series functions, $f_{100}$, $f_{200}$, and $f_{300}$ in analytical expression of spot distribution.

33. A spectrometer in which the location parameters of an entrance slit plane, a mirror, a diffraction grating, and an exit slit plane are located on a common plane and are determined by mathematically minimizing a set of power series functions, $f_{200}$, $f_{300}$, and $f_{400}$ in an analytical expression of spot distribution.

34. A spectrometer comprising,
   a. a spherical mirror for receiving and reflecting electromagnetic radiation from a light source shone through an entrance slit,
   b. a rotatable diffraction grating for receiving the electromagnetic radiation from the spherical mirror and reflecting a spectrum of said electromagnetic radiation;
   c. a plane mirror for receiving the spectrum from the diffraction grating and reflecting it to an exit port;
   d. an exit port having an image plane on which a single monochromatic beam of light can be selected;
   wherein the entrance slit, the spherical mirror, the grating, the plane mirror, and the exit slit are located in a common plane relative to one another according to values that mathematically minimize the merit function Q, where $$Q = \sum_{i=1}^{S} \epsilon(\lambda_i) q(\lambda_i),$$

where $\epsilon(\lambda_i)$ is a weighting factor and $q(\lambda_i)$ is a variance over the wavelengths $\lambda_i$.

35. The spectrometer of claim 34 additionally comprising a concave mirror located between the entrance slit and the spherical mirror.

36. The spectrometer of claim 34 wherein the plane mirror is movable.

37. The apparatus of claim 36 wherein the plane mirror movement is a function of the light source wavelength.

38. A spectrometer comprising,
   a. a spherical mirror for receiving and reflecting electromagnetic radiation from a light source shone through an entrance slit,
   b. a rotatable diffraction grating for receiving the electromagnetic radiation from the spherical mirror and reflecting a spectrum of said electromagnetic radiation;
   c. plane mirror for receiving the spectrum from the diffraction grating and reflecting it to an exit port;
   d. an exit port having an image plane on which a single monochromatic beam of light can be selected;
   wherein the entrance slit, the spherical mirror, the grating, the plane mirror, and the exit slit are located in common plane relative to one another according to values that mathematically minimize a set of power series functions, $f_{100}$, $f_{200}$, and $f_{300}$ in an analytical expression of spot distribution.

39. The monochromator of claim 38 additionally comprising a concave mirror located between the entrance slit and the spherical mirror.

40. The apparatus of claim 38 wherein the plane mirror is movable.

41. The apparatus of claim 40 wherein the plane mirror movement is a function of the light source wavelength.

42. A monochromator optical system comprising,
   a. a spherical mirror for receiving and reflecting electromagnetic radiation from a light source shone through an entrance slit,
   b. a rotatable diffraction grating for receiving the electromagnetic radiation from the spherical mirror and reflecting a spectrum of said electromagnetic radiation;
   c. a plane mirror for receiving the spectrum from the diffraction grating and reflecting it to an exit port,
   d. an exit port having an image plane on which a single monochromatic beam of light can be selected;
   wherein the entrance slit, the spherical mirror, the grating, the plane mirror, and the exit slit are located in a common plane relative to one another according to values that mathematically minimize a set of power series functions, $f_{200}$, $f_{300}$, and $f_{400}$ in an analytical expression of spot distribution.

43. The monochromator of claim 42 additionally comprising a concave mirror located between the entrance slit and the spherical mirror.

44. The apparatus of claim 42 wherein the plane mirror is movable.

45. The apparatus of claim 44 wherein the plane mirror movement is a function of the light source wavelength.

46. A method of projecting a fringe pattern on a grating blank in order to make an on plane holographic diffraction grating comprising the steps of,
   a) determining a set of recording parameters by mathematically minimizing the merit function Q, where $$Q = \sum_{i=1}^{S} \epsilon(\lambda_i) q(\lambda_i),$$

where $\epsilon(\lambda_i)$ is a weighting factor and $q(\lambda_i)$ is a variance over the wavelengths $\lambda_i$; and
   b) configuring a holographic diffraction grating recording apparatus in a common plane and in accordance with the recording parameters so determined.

47. A method for minimizing aberrations in a spectrometer comprising the steps of,
   a) determining a set of location parameters by mathematically minimizing the merit function Q, where $$Q = \sum_{i=1}^{S} \epsilon(\lambda_i) q(\lambda_i),$$

where $\epsilon(\lambda_i)$ is a weighting factor and $q(\lambda_i)$ is a variance over the wavelengths $\lambda_i$; and
   b) configuring the optical elements of the spectrometer in a common plane and in accordance with the location parameters so determined.

\* \* \* \* \*

UNITED STATES PATENT AND TRADEMARK OFFICE
CERTIFICATE OF CORRECTION

PATENT NO. : 5,978,110
DATED : November 2, 1999
INVENTOR(S) : Masato Koike

Page 1 of 2

It is certified that error appears in the above-identified patent and that said Letters Patent is hereby corrected as shown below:

| | |
|---|---|
| Claim 1 (Col. 11, line 6): | delete [on-plane] and substitute --in-plane-- therefor. |
| Claim 9 (Col. 12, line 25): | delete [on-plane] and substitute --in-plane-- therefor. |
| Claim 15 (Col. 13, line 19): | after the word "light" insert the words --ray traveling from the light-- |
| Claim 17 (Col. 13, line 40): | delete [on plane] and substitute --in-plane-- therefor. |
| Claim 22 (Col. 14, line 16): | after the word "blank" insert the word --and-- |
| Claim 32 (Col. 15, line 14): | after the word "located" delete [on] and substitute --in-- therefor. |

Signed and Sealed this

Fifteenth Day of August, 2000

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,978,110
DATED : November 2, 1999
INVENTOR(S) : Masato Koike

It is certified that error appears in the above-identified patent and that said Letters Patent is hereby corrected as shown below:

Claim 33 (Col. 15, line 20): after the word "located" delete [on] and substitute --in-- therefor.

Claim 46 (Col. 16, line 37): delete [on plane] and substitute --in-plane-- therefor.

Signed and Sealed this

Fifteenth Day of August, 2000

Attest:

Q. TODD DICKINSON

Attesting Officer

Director of Patents and Trademarks